(No Model.)
2 Sheets—Sheet 1.

T. J. KIELEY.
APPARATUS FOR RETURNING AND FEEDING WATER TO BOILERS.

No. 273,367.
Patented Mar. 6, 1883.

(No Model.) 2 Sheets—Sheet 2.

T. J. KIELEY.

APPARATUS FOR RETURNING AND FEEDING WATER TO BOILERS.

No. 273,367. Patented Mar. 6, 1883.

UNITED STATES PATENT OFFICE.

TIMOTHY J. KIELEY, OF NEW YORK, N. Y.

APPARATUS FOR RETURNING AND FEEDING WATER TO BOILERS.

SPECIFICATION forming part of Letters Patent No. 273,367, dated March 6, 1883.

Application filed November 4, 1882. (No model.)

*To all whom it may concern:*

Be it known that I, TIMOTHY J. KIELEY, of the city, county, and State of New York, have invented a new and useful apparatus for returning and feeding water to steam-boilers, and a new and useful valve in combination with a return-trap for returning said water of condensation, of which the following is a full, true, and exact description, reference being had to the accompanying drawings.

My invention consists in a combination of an equalizing steam-trap, which is at times filled with water, and at times emptied by the flow of water from said trap to the boiler, with a receiving-tank and connections from an engine-exhaust and from a coil system, for the purpose of heating the water to be fed to said return-trap; and it also consists in an improved valve connected with said returning-trap, as fully set out in the accompanying drawings.

Figure 1:
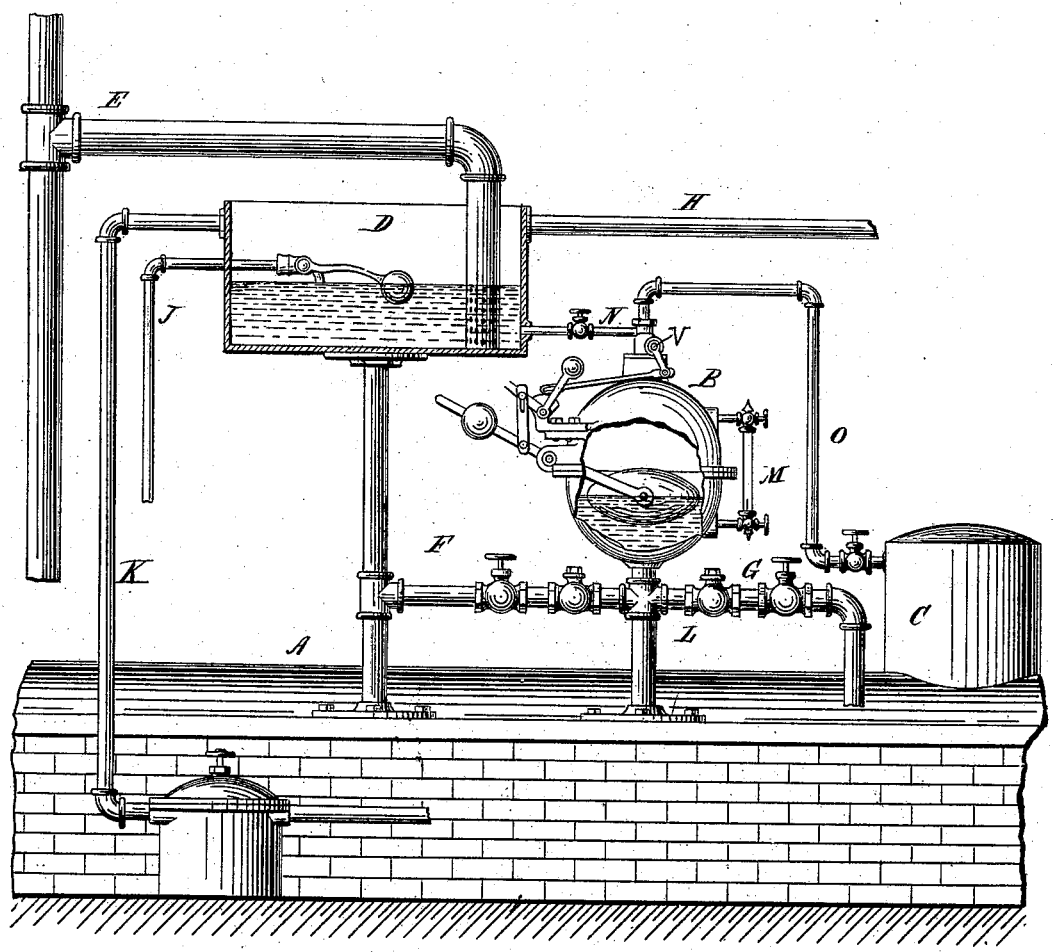
Figure 2:
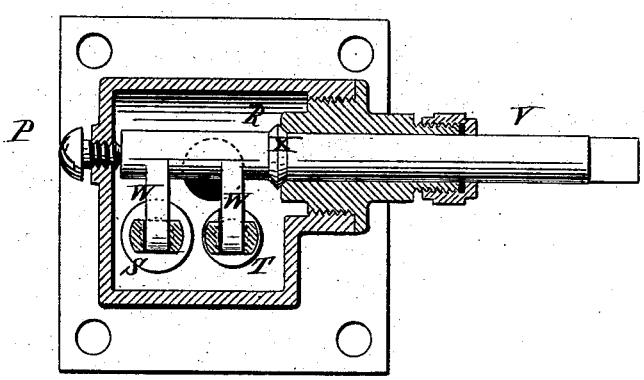
Figure 3:
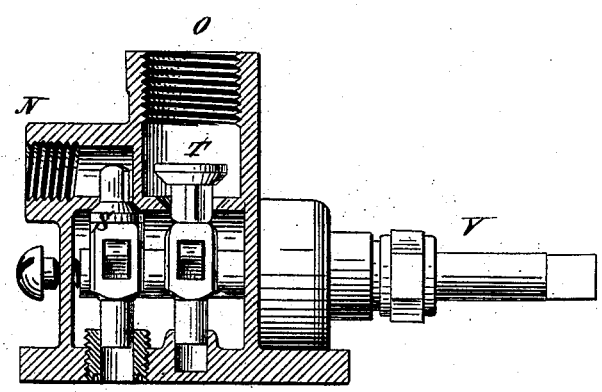

Figure 1 represents a vertical view, partly in section, of my trap and connections; Fig. 2, a view of the valve-box of my improved valve; Fig. 3, a view at right angles to Fig. 2, showing the valves in situation.

A represents generally a steam-boiler to which water is to be fed or returned; B, a trap, which may be of the kind previously patented to me on the 26th day of August, 1879, No. 218,885, or of other suitable construction. This trap is supported above the water-level of the boiler.

C represents the steam-drum of the boiler. This steam-drum communicates with the trap B by the equalizing steam-pipe O. The bottom of the trap is connected through a suitable union with the pipe G, leading to the boiler, and with the pipe F, leading to the tank D. Communicating with this tank D is the pipe E, which carries the exhaust of an engine, should one be employed in the building, and which should dip below the general surface of the water.

The pipe K communicates with a suitable drain-trap to receive the water of condensation from a heating-coil system in the building.

The pipe J, which should be provided with a suitable valve, communicates with the main water-supply, and is provided with a float-valve, so as to maintain a constant level in the tank D.

The pipe N communicates with the double valve of the trap B, hereinafter to be described, in such a way that when the trap B exhausts the exhaust-steam will pass from the trap through the pipe N into the water to be returned to the boiler.

H represents an overflow from the tank, which may be used to free the latter of oil, and is also useful to prevent accidental overflowing.

The equalizing-valve of the trap is shown fully in Figs. 2 and 3, which consists generally in a suitable valve-chest. A shaft, V, enters said chest, which is to be controlled by a float in the trap in the well-known way. Attached to this shaft V are two arms, W W, engaging with two valves, S and T. (Shown in Fig. 3.) The valve S seats upward and the valve T seats downward.

In the position shown in Fig. 3 steam will enter through the pipe O and pass to the trap, thereby causing the flow of the water contained in said trap to the boiler. If the shaft V be rotated to the left, or in the opposite direction to the hands of a watch, the valve T will be closed and the valve S opened, thereby allowing the trap B to exhaust through the pipe N into the collecting-tank. It will be observed that by the same motion of the shaft V the valve T is opened and the valve S closed, or vice versa, although both valves are above the shaft. The water to be returned by the trap B of course enters through the pipe F, connecting with the tank D in the usual way.

What I claim as my invention, and desire to secure by Letters Patent, is—

1. The combination of the boiler A, trap B, tank D, provided with return-pipe from coils K, supply-pipe J, and engine-exhaust connection E, with the exhaust-pipe N, communicating with the trap for the purpose of heating the water in said tank, substantially as described.

2. The system of returning or feeding heated water to a boiler, which consists in collecting the water of condensation from a closed steam heating-coil in a drain-trap or receiving-vessel into which the water enters, and which is located at the lowest point of the closed system, of carrying said water upward to a tank above the water-level of the boiler, of delivering said water into said tank above said water-level, of adding thereto such additional water as may be necessary to supply the boiler, and of heating said combined water before it passes to a returning steam-trap by the exhaust from said trap, substantially as described.

TIMOTHY J. KIELEY.

Witnesses:
GEO. H. EVANS,
WM. A. POLLOCK.